United States Patent
Derda

(10) Patent No.: US 9,050,779 B2
(45) Date of Patent: Jun. 9, 2015

(54) LAMINATED GLAZING WHICH INCLUDES ONE OR MORE WIRES

(75) Inventor: Martin Derda, Bochum (DE)

(73) Assignee: PILKINGTON AUTOMOTIVE DEUTSCHLAND GMBH, Witten (DE)

( * ) Notice: Subject to any disclaimer, the term of this patent is extended or adjusted under 35 U.S.C. 154(b) by 815 days.

(21) Appl. No.: 12/741,078

(22) PCT Filed: Nov. 4, 2008

(86) PCT No.: PCT/EP2008/064962
§ 371 (c)(1),
(2), (4) Date: May 3, 2010

(87) PCT Pub. No.: WO2009/059981
PCT Pub. Date: May 14, 2009

(65) Prior Publication Data
US 2010/0255238 A1    Oct. 7, 2010

(30) Foreign Application Priority Data

Nov. 5, 2007 (GB) .................................. 0721682.3

(51) Int. Cl.
*B32B 3/24* (2006.01)
*B32B 17/10* (2006.01)
*B60S 1/08* (2006.01)

(52) U.S. Cl.
CPC ... *B32B 17/10036* (2013.01); *Y10T 428/24331* (2015.01); *Y10T 428/24802* (2015.01); *Y10T 428/24868* (2015.01); *B32B 17/10* (2013.01); *B32B 17/10174* (2013.01); *B32B 17/10376* (2013.01); *B32B 17/10761* (2013.01);

(Continued)

(58) Field of Classification Search
CPC ................... B32B 17/10174; B32B 17/10165
USPC ......................................... 428/138, 195.1, 34
See application file for complete search history.

(56) References Cited

U.S. PATENT DOCUMENTS

| 5,364,685 A | 11/1994 | Nakashima et al. |
| 5,898,407 A | 4/1999 | Paulus et al. |
| 6,094,981 A | 8/2000 | Hochstein |

(Continued)

FOREIGN PATENT DOCUMENTS

| DE | 102005006772 A1 | 8/2006 |
| EP | 0 717 459 A1 | 6/1996 |

(Continued)

OTHER PUBLICATIONS

International Search Report issued by the European Patent Office on Mar. 2, 2009 as the International Searching Authority in International Application No. PCT/JP2008/064962.

(Continued)

*Primary Examiner* — William P Watkins, III
(74) *Attorney, Agent, or Firm* — Buchanan Ingersoll & Rooney PC

(57) ABSTRACT

A laminated glazing (e.g. a vehicle windscreen) comprising two panes of glazing material (e.g. glass) having a ply of laminating interlayer extending between them, one or more wires between the panes of glazing material, arranged so as to form a sensing area of a capacitive rain sensor and/or an inductive coupling coil, and an infrared reflective coating provided on a surface of the glazing, wherein in the region of the sensing area and/or the inductive coupling coil, the coating is at most only partially provided.

20 Claims, 3 Drawing Sheets

(52) U.S. Cl.
CPC .............. *B60S1/0825* (2013.01); *B60S 1/0877* (2013.01); *B32B 17/10183* (2013.01)

(56) References Cited

U.S. PATENT DOCUMENTS

| | | | |
|---|---|---|---|
| 7,379,028 B2 * | 5/2008 | Hisaeda | 343/713 |
| 2001/0053722 A1 * | 12/2001 | Miller | 473/462 |
| 2003/0155790 A1 | 8/2003 | Noguchi et al. | |
| 2007/0044542 A1 | 3/2007 | Barguirdjian et al. | |
| 2007/0276550 A1 * | 11/2007 | Desai et al. | 701/1 |
| 2008/0265913 A1 * | 10/2008 | Netzer | 324/669 |

FOREIGN PATENT DOCUMENTS

| | | |
|---|---|---|
| EP | 1 821 098 A1 | 8/2007 |
| WO | WO 96/36511 | 11/1996 |
| WO | WO 2007/006781 A1 | 1/2007 |
| WO | WO 2007/009974 A1 | 1/2007 |
| WO | WO 2007/029248 A2 | 3/2007 |
| WO | WO 2007/093822 A1 | 8/2007 |

OTHER PUBLICATIONS

Search Report issued by the UK Intellectual Property Office in GB Application No. 0721682.3.

* cited by examiner

LAMINATED GLAZING WHICH INCLUDES ONE OR MORE WIRES

The present invention relates to a wired glazing, especially to a laminated glazing, which includes one or more wires within its structure.

One or more wires may be included within a laminated glazing for a number of reasons. In the form of a grid typically co-extensive with a glazing, wires may enhance the structural integrity of the glazing. Present as a plurality extending over the whole or a part of a glazing, wires may enable the glazing to be heated when electrical current is supplied to them. One or more wires may be arranged so as to transmit/receive electromagnetic signals, for example forming an antenna, and/or to form part of an electrical circuit, for example a capacitive circuit.

Most commonly such laminated glazings may be used as vehicle glazings, although their use is not so limited. In providing a glazing for a vehicle however certain other secondary functions, in addition to one or more of the main functions described above, may have to be considered. For example many vehicle glazings are now provided with solar control functionality, meaning that they are capable of reducing the amount of solar heat which may otherwise enter a vehicle, heat its interior and cause discomfort to its passengers. Amongst other possibilities, the solar control functionality may be provided in the form of a solar control coating (often for control of transmission of infrared radiation through the glazing) on one of the surfaces of a glazing, i.e. on a surface of a pane of glazing material or on a surface of some other ply of material comprised in the glazing. These coatings are typically based on layers of metals, metals oxides and interleavent dielectric materials, and have solar (e.g. infrared) reflective properties.

Unfortunately it appears that when such a solar control coating is incorporated into a wired laminated glazing of the type generally described above, there may be a decrease or loss in function of the wires. This may especially be the case when the wires form part of an electrical circuit as there may be electrical interference between the wires and the coating. One obvious solution to this problem is to remove the solar control function altogether, but this would appear to be a backward step in terms of vehicle passenger comfort. Another obvious solution would be to provide a different type of coating that does not interfere with the function of the wires. However this could (and probably would) be a more expensive solution and may not perform as well (in terms of solar control) as the known coatings.

It is therefore an object of the present invention to provide a glazing incorporating one or more wires having electrical functionality such as described above, along with a solar control coating, which does not suffer the same electrical interference problem as prior art glazings.

Accordingly the present invention provides a laminated glazing comprising:

two panes of glazing material having a ply of laminating interlayer extending between them, one or more wires between the panes of glazing material, arranged so as to form a sensing area of a capacitive rain sensor and/or an inductive coupling coil, and an infrared reflective coating provided on a surface of the glazing, wherein in the region of the sensing area and/or the inductive coupling coil, the coating is at most only partially provided, meaning that there are one or more discontinuities present in the coating layer in this/these region(s), to reduce the level of electrical interference between the wires and the coating that may otherwise occur when electrical power is supplied to the glazing.

The panes of glazing material may be panes of glass, preferably soda-lime-silica glass which may be clear or body-tinted, or they may be panes of a rigid plastics material such as polycarbonate. Typically the panes of glazing material are used in a thickness between 1 and 10 mm, preferably between 1.5 and 6 mm.

The ply of interlayer material may be provided as one of the following types of material: polyvinyl chloride (PVC), polyurethane (PU), ethylvinylacetate (EVA), polyethylene terephthalate (PET), polyamide (PA) or polyvinyl butyral (PVB). The ply of interlayer material may typically be provided in thickness of either 0.76 mm or 0.38 mm.

The one or more wires may be of a dark colour (for example dark grey or black) so as to minimise their visual appearance to the naked eye. The wires, which are typically made from a lustrous conductive material such as silver or copper, may be made dark in colour by coating them with a suitably dark-coloured material, such as a black-tinted plastics material.

The coating preferably includes one or more metallic layers (or metal oxide layers) and one or more dielectric layers, typically forming a transparent (or substantially transparent) multilayer stack. The multilayer stack structure may be repeated to enhance the reflectivity of the film. Amongst other similar metals, silver, gold, copper, nickel and chromium may be used as the metallic layer in a multilayer stack; indium oxide, antimony oxide or the like may be used as the metal oxide layer. Films comprising one or two layers of silver interleaved between layers of a dielectric such as an oxide of silicon, aluminium, titanium, vanadium, tin or zinc are typical multilayer stacks.

Preferably in the region of the sensing area and/or the inductive coupling coil, the coating is provided in the form of a grid having coated areas and non-coated areas (thus being at most only partially provided on a surface of the glazing). Such a configuration is perceived to be preferable because the visual impact of the lack of coating may be minimised (despite the coating being substantially transparent), so that when for example the glazing is viewed at a 45° angle of observance, the grid in the coating is only minimally observable (if indeed it is observable at all). This is especially important if the sensing area and/or the coupling coil are located in a major vision area of the glazing, i.e. an area critical for visibility through the glazing.

A non-coated area may be formed by masking a selected area on the ply of material (for example a pane of glazing material) onto which the coating is to be deposited, so that when it is deposited, the selected area remains devoid of coating. An non-coated area may alternatively be formed by selective removal of the coating from the ply of material on which it has been deposited in a selected area, for example by laser ablation. The non-coated areas comprised in the grid may be in the form of tracks, preferably having a width (i.e. the spacing between adjacent coated areas) greater than 50 µm, but less than 100 µm to prevent the tracks from being visible. The width of the tracks is further preferably in the range 60 to 90 µm, and most preferably in the range 70 to 80 µm. Advantageously the ratio of coated area to non-coated area is at least 70:30, preferably 80:20. However, it may be that the region of the sensing area and/or the inductive coupling coil is completely devoid of coating material.

In relation to the glazing, a description of the coating as being "provided on a surface of the glazing" means that the coating layer may be on a surface of one of the panes of glazing material, or on a surface of the ply of interlayer material. If the latter, the coating may be provided on a ply of PET, which itself may be interleaved between two plies of PVB forming a composite interlayer which is used to laminate the two panes of glazing material together. If the former and conventional surface-numbering terminology is used, wherein the surface of the laminate which contacts the environment external to a vehicle is known as surface 1 and the surface which contacts the internal environment is known as surface 4, then the coating may be supported on either surface 2 or surface 3 (the inner surface of the outer pane and the inner surface of the inner pane respectively), where it may be protected from damage.

The one or more wires may preferably be positioned adjacent to surface two of the glazing; this appears to be the optimum location to enable satisfactory moisture detection of surface one of the glazing whilst protecting the wires from degradation.

When the coating is provided on surface two of the glazing, it will be located between the wires and surface one of the glazing. Were the glazing not one according to the invention, the coating would interfere in the capacitive sensing of moisture on surface one and may interfere with inductive coupling of electrical power from an external power source to the coupling coil (despite not being located between the two), both of which would lead to unreliable functioning of the rain sensor.

When the coating is provided on surface three of the glazing, or on a surface of a ply of interlayer material, it will be located behind the wires (from the viewpoint of surface one of the glazing). However, were the glazing not one according to the invention, the coating would still interfere in the capacitive sensing of moisture on surface one and would also interfere with inductive coupling of electrical power from an external power source to the coupling coil, again leading to unreliable functioning of the rain sensor.

Advantageously an opaque band may be provided around the periphery of a surface of the glazing and, if present, the inductive coupling coil may be located in the region of the glazing over which the opaque band is provided. The opaque band may be screen-printed using a black ink or enamel onto a surface of a pane of glazing material (typically surface two and/or surface four). Such a band is also known in the art as an obscuration band. Because the inductive coupling coil may be formed from multiple overlapping loops of wires, such a configuration is likely to be more visible than a single wire. Thus positioning the coil within the area of the glazing covered by the opaque band so as to be hidden from view appears to be an aesthetically pleasing solution.

In this case, for ease of manufacture, an aperture may preferably be provided in the ply of interlayer material in the region of the inductive coupling coil to ensure that this region is devoid of coating. Both the aperture and the coil may be hidden from view by the opaque band.

Preferably the one or more wires are arranged in the form of sensing area of a capacitive rain sensor, effectively forming one or more capacitive plates. As is known in the art, a capacitive rain sensor may be included a glazing, especially a vehicle glazing, to enable automatic operation of wiper blades.

In addition (or as an alternative), the one or more wires may also be arranged in the form of an inductive coupling coil, for inductively coupling electrical current through the plies of the glazing between the coupling coil (which may be attached to an electrical device, such as the sensing area of a capacitive rain sensor, within the glazing) and an electrical device on the exterior of the glazing. Preferably the wires may be deposited directly onto a ply of interlayer material, using any suitable technique such as ultrasonic bonding or resistive heating.

Although a glazing according to the invention may be used in any position or location where a laminated glazing is typically installed, it is most preferably used as a vehicle glazing. Further preferably, the glazing may be used as a windscreen, although it may also be used as a backlight (rear window), sidelight (side window) and/or rooflight (roof glazing).

For a better understanding the present invention will now be more particularly described, by way of non-limiting example, with reference to and as shown in the accompanying schematic drawings (not to scale) in which.

Figure 1:
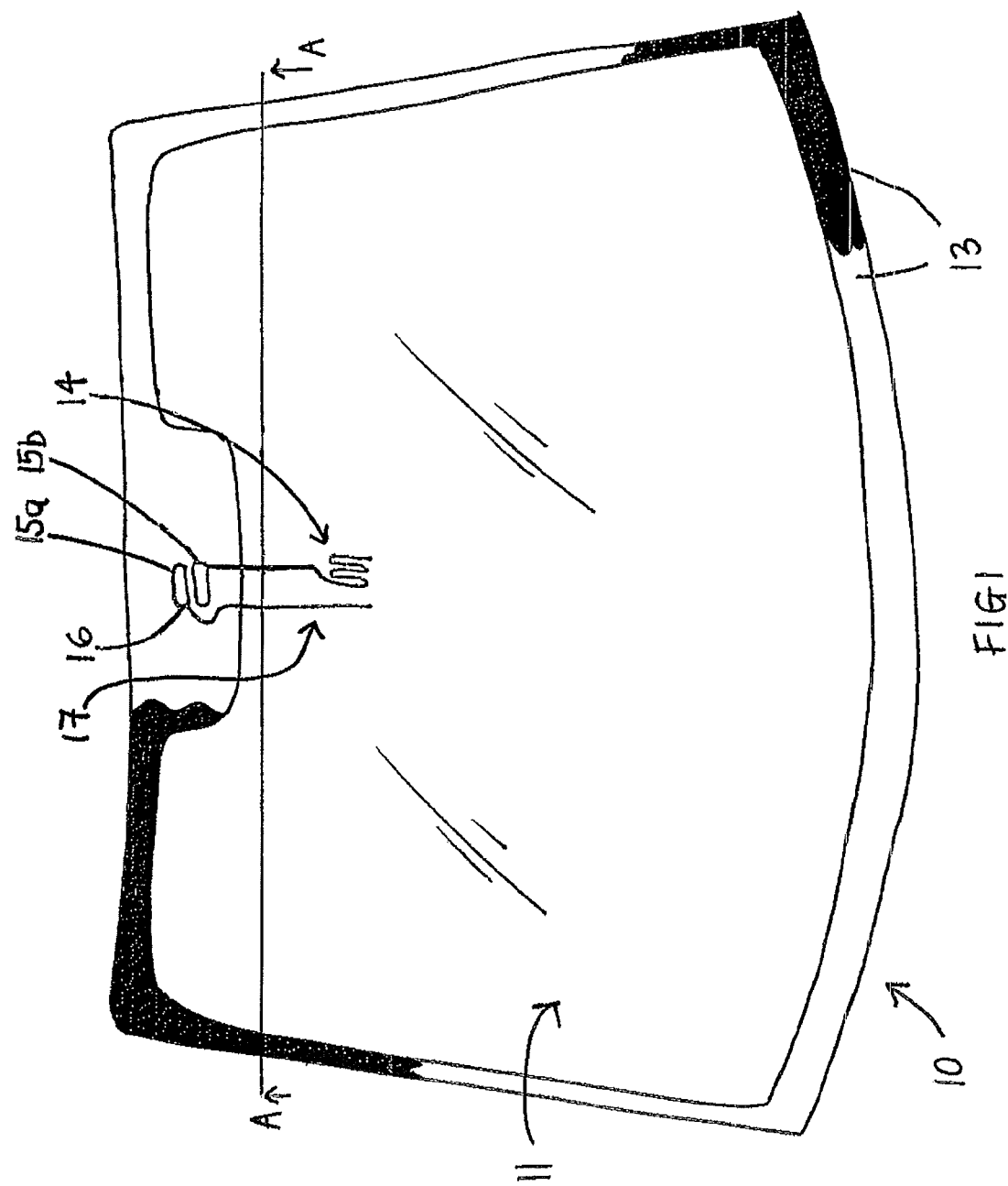
FIG. 1 is a plan view of a laminated glazing according to the invention.

FIG. 1 shows a laminated glazing, in the form of a vehicle windscreen 10, comprising an outer pane of glazing material, in the form of a pane of 2.1 mm thick clear soda-lime-silica glass 11, and one or more wires 16, arranged into the form of a capacitive rain sensor 14, a temperature compensation structure 17 and inductive coupling coils 15*a*, 15*b*. Rain sensor 14 and temperature compensation structure 17 are mostly located in the vision area of the glazing, whereas coils 15*a*, 15*b* are hidden from view. Around the periphery of windscreen 10 there is a band of opaque ink (typically a black enamel), in the form of an obscuration band 13. Obscuration band 13 is there to disguise and protect the sealant (not shown) that is used to fix the window into a vehicle (not shown), and also to hide inductive coupling coils 15*a*, 15*b*.

Figure 2:
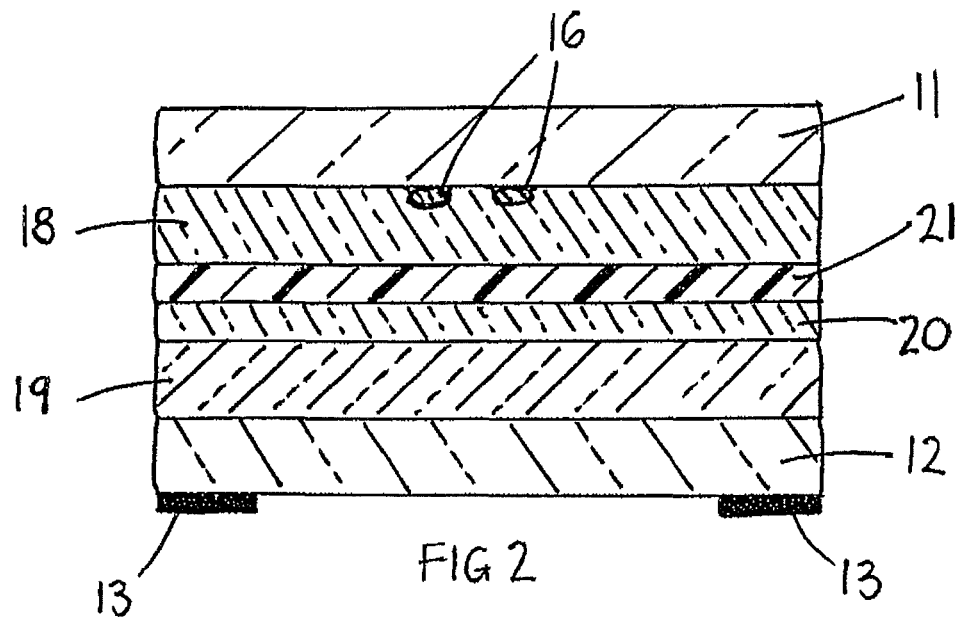
FIG. 2 is a cross-section viewed along line A-A of FIG. 1.

FIG. 2 provides more detail about the construction of windscreen 10 in that it further comprises inner pane of glazing material, also in the form of a 2.1 mm thick pane of clear soda-lime-silica glass 12, and a composite interlayer constructed from three plies of interlayer material. These plies of interlayer material are in the form of two outer plies of 0.38 mm thick clear PVB 18, 19 and a central ply of PET 20, on which a silver-based transparent coating stack 21 facing outer pane of glass 11 is located, to reflect solar radiation. As an alternative to the composite interlayer having a solar control function, windscreen 10 may comprise a ply of PVB 18 and a solar control coating (not shown) on the inner surface of outer glass 11 and/or inner glass 12.

Panes of clear glass 11, 12 of approximate composition 72% (by weight) $SiO_2$, 1% $Al_2O_3$, 0.1% $Fe_2O_3$, 13.5% $Na_2O$, 0.6% $K_2O$, 8.5% CaO, 4% MgO and 0.2% $SO_3$ may be obtained from Pilkington Group Limited in the UK (www.pilkington.com). Ply of PET 20 bearing silver-based coating 21 may be obtained from Southwall Technologies Inc., 3975 East Bayshore Road, Palo Alto, Calif. 94303, US (www.southwall.com).

Wires 16 are located between ply of PVB 18 and outer pane of glass 11, to enable capacitive detection of the presence of raindrops on the outer surface of outer pane of glass 11. Wires 16 are bonded to both ply of PVB 18 and outer pane of glass 11 because each is provided with an outermost sheath of PVB. Wires 16 are available under the product number BP 180 from Elektrisola Eckenhagen, In der Hüttenwiese, 51580 Reichshof-Eckenhagen, Germany (www.elektrisola.com).

Figure 4:
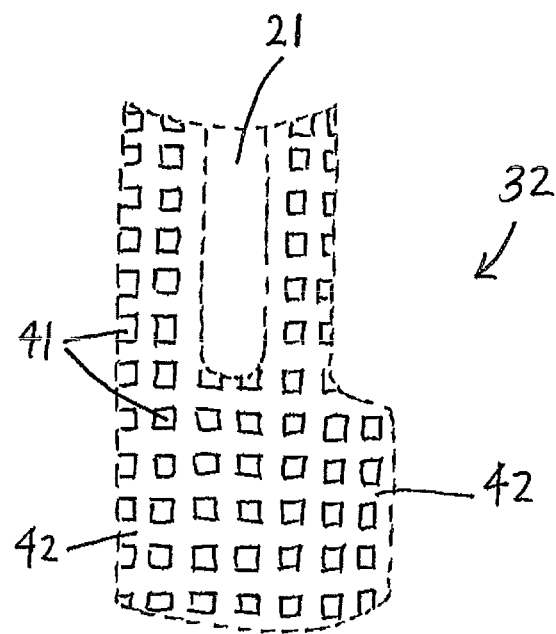
FIG. 4 is detailed view taken from part of FIG. 3.
Figure 3:
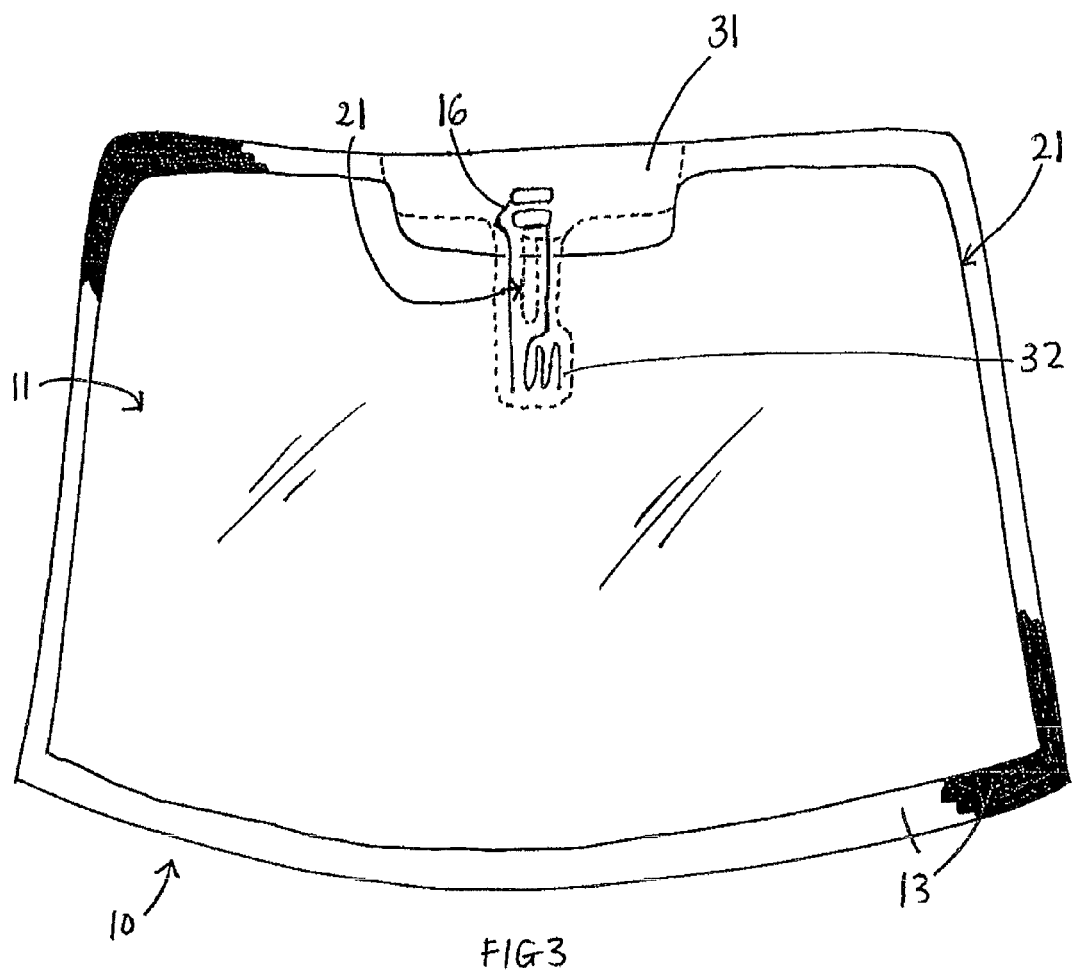
FIG. 3 is a further plan view of a laminated glazing according to the invention.

FIGS. 3 and 4 illustrate the manner in which coating stack 21 is at most only partially provided in the region of sensor 14, temperature compensation structure 17 and coupling coils 15*a*, 15*b*. Within the area of coating 21 there is an area completely devoid of coating 31, which is formed by masking the desired area prior to the coating being deposited, and a grid area 32 formed of coated areas 41 and non-coated areas 42. The non-coated areas 42 are formed by laser ablation of coating 21 post-deposition to create the pattern shown in FIG. 4. The laser lines are 70 μm in thickness and are spaced apart by a distance of 0.9 mm (900 μm). This grid is thought to be optimum to minimise electrical interference between rain sensor 14 and coating 21 in the capacitive detection of moisture on surface one of glazing 10.

To illustrate the effect of complete removal of coating 21 and/or partial removal of coating 21 to form a grid area 32, the following measurements were made on samples of glazing 10 of construction as described above for the following scenarios:

Scenario A: no coating removal at all;
Scenario B: complete removal of coating 21 (by cutting an aperture in ply of PET 20) in the region of coils 15*a*, 15*b*;
Scenario C: as per scenario B but also with formation of a grid area by laser ablation of coating 21 in the region of capacitive sensor 14 and temperature compensation structure 17.

|  | Scenario A | | Scenario B | | Scenario C | |
| --- | --- | --- | --- | --- | --- | --- |
|  | Temperature Compensation Structure | Rain Sensor Structure | Temperature Compensation Structure | Rain Sensor Structure | Temperature Compensation Structure | Rain Sensor Structure |
| Average Resonance Frequency (MHz) | 17 | 12.7 | 17.82 | 14.4 | 17.87 | 14.46 |
| Amplitude (dB) | −1.1 | −0.9 | −1.7 | −1.5 | −2 | −1.8 |

The resonance frequency of the capacitive rain sensor plates and temperature compensation structures in each of the samples were measured, along with the frequency amplitude of the inductive coupling coils for each. To perform these tests a single length of wire was formed into a loop of the same dimensions as the inductive coupling coils in each sample. This loop was systematically aligned with the inductive coupling coils in each sample and the free end connected to an HP 8753A Networkanalyser to take the measurements. The results of these tests, shown in the table above, have been normalised to a temperature of 20° C. to eliminate the effect of fluctuating temperature.

It can be seen that the average resonance frequency of the rain sensor structure increases sharply from 12.7 MHz to 14.4 MHz (greater than 13% increase) once the coating has been removed in the area of the corresponding inductive coupling coils, and increases slightly more to 14.46 MHz once the coating is laser ablated to form a grid in the region of the rain sensor. Similarly the amplitude sharply becomes more negative (from −0.9 dB to −1.5 dB) once the coating has been removed in the area of the corresponding inductive coupling coils, and yet further negative (to −1.8 dB) once the laser grid has been generated, indicating increasingly successful inductive coupling between the test loop and the loops within the glazing.

The invention claimed is:

1. A laminated glazing comprising:
    two panes of glazing material having a ply of laminating interlayer extending between them,
    one or more wires between the panes of glazing material, the one or more wires being coated with an insulating coating and arranged so as to form a sensing area of a capacitive rain sensor and an inductive coupling coil, and
    an infrared reflective coating provided on a surface of the glazing,
    wherein in the region of the sensing area and the inductive coupling coil, the infrared reflective coating is at most only partially provided, and
    wherein in the region of the sensing area and/or the inductive coupling coil, the infrared reflective coating is provided in the form of a grid having coated areas and non-coated areas.

2. A laminated glazing as claimed in claim 1 wherein the non-coated areas are in the form of tracks having a width of greater than 50 μm.

3. A laminated glazing as claimed in claim 1 wherein the ratio of coated area to non-coated area is at least 70:30.

4. A laminated glazing as claimed in claim 1 wherein the region of the sensing area and/or the inductive coupling coil is devoid of the infrared reflective coating.

5. A laminated glazing as claimed in claim 1 wherein the infrared reflective coating is provided on a surface of a pane of glazing material.

6. A laminated glazing as claimed in claim 1 wherein the infrared reflective coating is provided on a surface of a ply of interlayer material.

7. A laminated glazing as claimed in claim 1 wherein an opaque band is provided around the periphery of a surface of the glazing and the inductive coupling coil is located in the region of the glazing over which the opaque band is provided.

8. A laminated glazing as claimed in claim 7, wherein an aperture in the ply of interlayer material is provided in the region of the inductive coupling coil.

9. A vehicle glazing comprising a laminated glazing as claimed in claim 1.

10. The vehicle glazing as claimed in claim 9, wherein the vehicle glazing is a windscreen, a backlight, a sidelight and/or a rooflight.

11. A laminated glazing as claimed in claim 2 wherein the ratio of coated area to non-coated area is at least 70:30.

12. A laminated glazing as claimed in claim 1 wherein the infrared reflective coating is provided on a surface of a pane of glazing material.

13. A laminated glazing as claimed in claim 4 wherein the infrared reflective coating is provided on a surface of a pane of glazing material.

14. A laminated glazing as claimed in claim 1 wherein the one or more wires are arranged to form the sensing area of the inductive coupling coil, and further comprising an opaque band around a periphery of a surface of the glazing, and the inductive coupling coil is located in a region of the glazing over which the opaque band extends.

15. A laminated glazing as claimed in claim 5 wherein the one or more wires are arranged to form the sensing area of the inductive coupling coil, and further comprising an opaque band around a periphery of a surface of the glazing, and the inductive coupling coil is located in a region of the glazing over which the opaque band extends.

16. A laminated glazing as claimed in claim 6 wherein the one or more wires are arranged to form the sensing area of the inductive coupling coil, and further comprising an opaque band around a periphery of a surface of the glazing, and the inductive coupling coil is located in a region of the glazing over which the opaque band extends.

17. A laminated glazing as claimed in claim 1 and further comprising an aperture in the ply of laminating interlayer.

18. A laminated glazing as claimed in claim 1 wherein the ply of laminating interlayer is a first ply of interlayer material, and further comprising a second ply of interlayer material and a third ply of interlayer material, the second and third plies of interlayer material being positioned between the two panes of glazing material, and the first ply of interlayer material being positioned between the second and third plies of interlayer material, and further including an aperture in the first ply of interlayer material and positioned in a region of the inductive coupling coil.

19. A laminated glazing as claimed in claim 1 wherein the ply of laminating interlayer is a coating applied to one ply of interlayer material, and further comprising two additional plies of interlayer material positioned between the two panes of glazing material, and the one ply of interlayer material being positioned between the two additional plies of interlayer material, and further including an aperture in the one ply of interlayer material to remove the coating.

20. A laminated glazing comprising:

two panes of glazing material having a ply of laminating interlayer extending between them, one or more wires between the panes of glazing material, arranged so as to form a sensing area of a capacitive rain sensor and an inductive coupling coil formed from multiple overlapping loops of the one or more wires, and an infrared reflective coating provided on a surface of the glazing, wherein in the region of the sensing area and the inductive coupling coil, the infrared reflective coating is at most only partially provided.

* * * * *